No. 786,960. PATENTED APR. 11, 1905.
G. W. DENIEF.
VALVE.
APPLICATION FILED DEC. 8, 1903.

Inventor
George W. Denief.
By Victor J. Evans
Attorney

Witnesses
G. W. Riley
Hubert D. Lawson

No. 786,960. Patented April 11, 1905.

UNITED STATES PATENT OFFICE.

GEORGE W. DENIEF, OF LOWELL, MASSACHUSETTS.

VALVE.

SPECIFICATION forming part of Letters Patent No. 786,960, dated April 11, 1905.

Application filed December 8, 1903. Serial No. 184,307.

*To all whom it may concern:*

Be it known that I, GEORGE W. DENIEF, a citizen of the United States, residing at Lowell, in the county of Middlesex and State of Massachusetts, have invented new and useful Improvements in Valves, of which the following is a specification.

My invention relates to new and useful improvements in valves, and more particularly to faucets and similar devices. Its object is to provide a device of this character having removable working parts, the same being so constructed and arranged as to be readily replaced when worn.

The great difficulty experienced with faucets is the wearing of the valve-seat and the thread employed for operating the valve.

The object of my invention is to overcome these objections by employing an internally-threaded detachable tube in which is mounted the rotary valve of the faucets, and secured to the end of this valve is a detachable washer for sealing the faucet and a detachable valve-seat, which is secured in place by the tube.

With the above and other objects in view the invention consists in the novel construction of parts hereinafter more fully described and claimed, and illustrated in the accompanying drawings, showing the preferred form of my invention, and in which—

Figure 1:
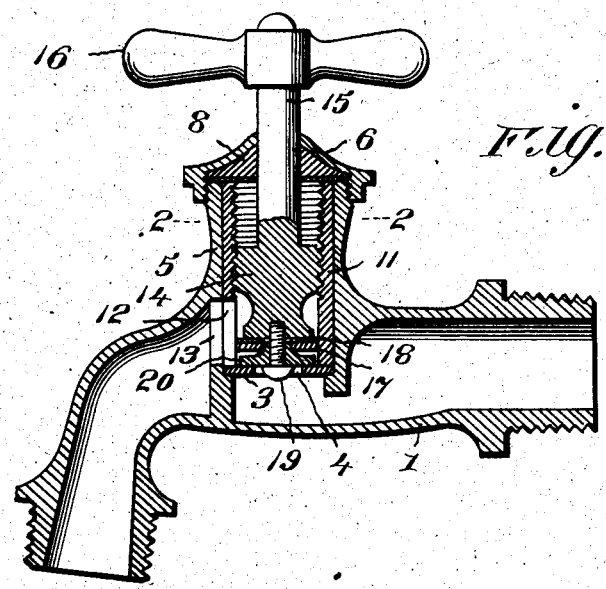
Figure 2:
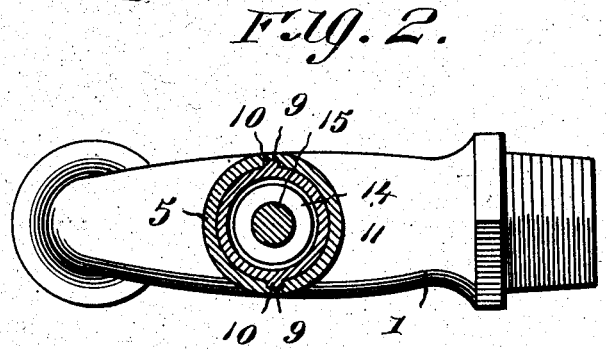
Figure 3:
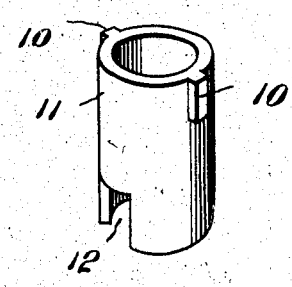
Figure 4:

Figure 1 is a section through a faucet constructed in accordance with my invention. Fig. 2 is a section on line 2 2, Fig. 1. Fig. 3 is a detail view of the threaded tube. Fig. 4 is a detail view of the detachable valve-seat.

Referring to the figures by numerals of reference, 1 is the body of the faucet, the same having a partition 2 therein, in rear of which is located a detachable valve-seat 3. This valve-seat has an aperture 4 therein in alinement with an extension 5 of the body, and the upper end of this extension is normally closed by a cap 6, which is externally screw-threaded and adapted to engage threads 7, formed upon the outer face of the extension 5. Suitable packing 8 may be interposed between the cap 6 and the end of the extension 5. Longitudinally-extending grooves 9 are formed within the extension 5 and are adapted to receive lugs 10, arranged at opposite sides of an internally-screw-threaded tube 11. This tube is adapted to be seated on the detachable valve-seat 3 within the extension 5 and has a cut-away portion 12 at its lower end, which registers with the outlet 13, formed within the partition 2. A screw 14 is mounted in the tube 11 and has a stem 15 projecting therefrom and through the center of the cap 6, said stem being provided with arm 16, whereby it may be readily rotated. A metallic disk 17 is arranged upon the lower end of the screw 14 and is spaced therefrom by a washer 18, of rubber or other suitable material. This disk and washer fit snugly within the tube 11 and are held in place by a screw 19, which extends into the inner end of the screw 14 and holds a washer 20 in place upon the disk 17. This washer 20 is of such size as to close the aperture 4, and the disk 17 serves to compress it upon the valve-seat 3 when the faucet is closed. When it is desired to open the faucet, the stem 15 is rotated so as to move the screw 14 upward within the tube 11. The disk 17 will move upward and relieve the washer 20 from pressure, and said washer will also be carried upward with the screw, and thereby open the aperture 4 and permit water to flow upward through said aperture and the outlet 13. When any of the parts become worn, they can be readily replaced by first removing the cap 6. The stem 15 is then drawn upward and will carry the tube 11 therewith, thereby disengaging the lug 10 from the grooves 9. Should the threads within the tube become injured, a new tube can be readily substituted therefor, and should the washer 20 or the valve-seat 3 be worn or destroyed new ones can readily be substituted by detaching the tube 11 and inserting a new washer 20 or a new valve-seat 3.

While I have shown this form of valve used in connection with a faucet, it will be understood that I do not limit myself to such use, for, if desired, the same can be employed in connection with any form of cut-off.

It will be understood that the valve-seat can be formed of any desired material, preferably of brass in hot-water valves and glass in cold-water valves.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described my invention, what is claimed as new is—

In a device of the character described, the combination with a valve-casing having an outlet, and an extension; of a flat detachable metallic valve-seat within the casing, an internally-screw-threaded non-rotatable tube within the extension and bearing upon the valve-seat to hold the same rigidly in position, said tube having an opening through one portion thereof which registers with the outlet in the valve-casing and the valve-seat being wholly independent of and free from engagement with the tube, means for detachably securing the tube in the extension, a screw within and engaging the tube, a washer at one end of the screw adapted to clamp upon the detachable valve-seat, a metallic disk interposed between said washer and screw and fitting snugly within and adapted to slide upon the inner wall of the tube, and means for rotating the screw.

In testimony whereof I affix my signature in presence of two witnesses.

GEORGE W. DENIEF.

Witnesses:
 JOHN DEVLIN,
 JAMES B. CASEY.